Nov. 18, 1930. G. H. HAINES Re. 17,875

MIXING APPARATUS

Original Filed Oct. 11, 1929 3 Sheets-Sheet 1

INVENTOR
George H. Haines
By Duckworth Martin
Attorney

Nov. 18, 1930. G. H. HAINES Re. 17,875

MIXING APPARATUS

Original Filed Oct. 11, 1929 3 Sheets-Sheet 2

INVENTOR
George H. Haines
By Archworth Martin
attorney

Nov. 18, 1930. G. H. HAINES Re. 17,875

MIXING APPARATUS

Original Filed Oct. 11, 1929 3 Sheets-Sheet 3

INVENTOR
George H. Haines
By Archworth Martin
Attorney

Reissued Nov. 18, 1930

Re. 17,875

UNITED STATES PATENT OFFICE

GEORGE HERBERT HAINES, OF CALEDONIA, OHIO, ASSIGNOR TO THE GRAIN MACHINERY COMPANY, OF MARION, OHIO, A CORPORATION OF OHIO

MIXING APPARATUS

Original No. 1,769,576, dated July 1, 1930, Serial No. 398,902, filed October 11, 1929. Application for reissue filed August 27, 1930. Serial No. 478,262.

My invention relates to mixing apparatus, and more particularly to apparatus for mixing food materials for live stock, but it may be employed in mixing materials of other kinds.

One object of my invention is to provide apparatus for effectively mixing materials into which is introduced a liquid content such as molasses, for example.

Another object of my invention is to provide in combination with a mixing apparatus, means for more effectively removing the mixed materials therefrom.

A further object of my invention is to provide an improved means for charging the materials to the mixing apparatus.

Another object of my invention is to provide means for more effectively circulating materials during a mixing operation and for intermixing the materials to produce a thorough dissemination of the various ingredients through the resulting mixture.

Still another object of my invention is to simplify and improve generally the structure and operation of apparatus of the character referred to.

Figure 1:
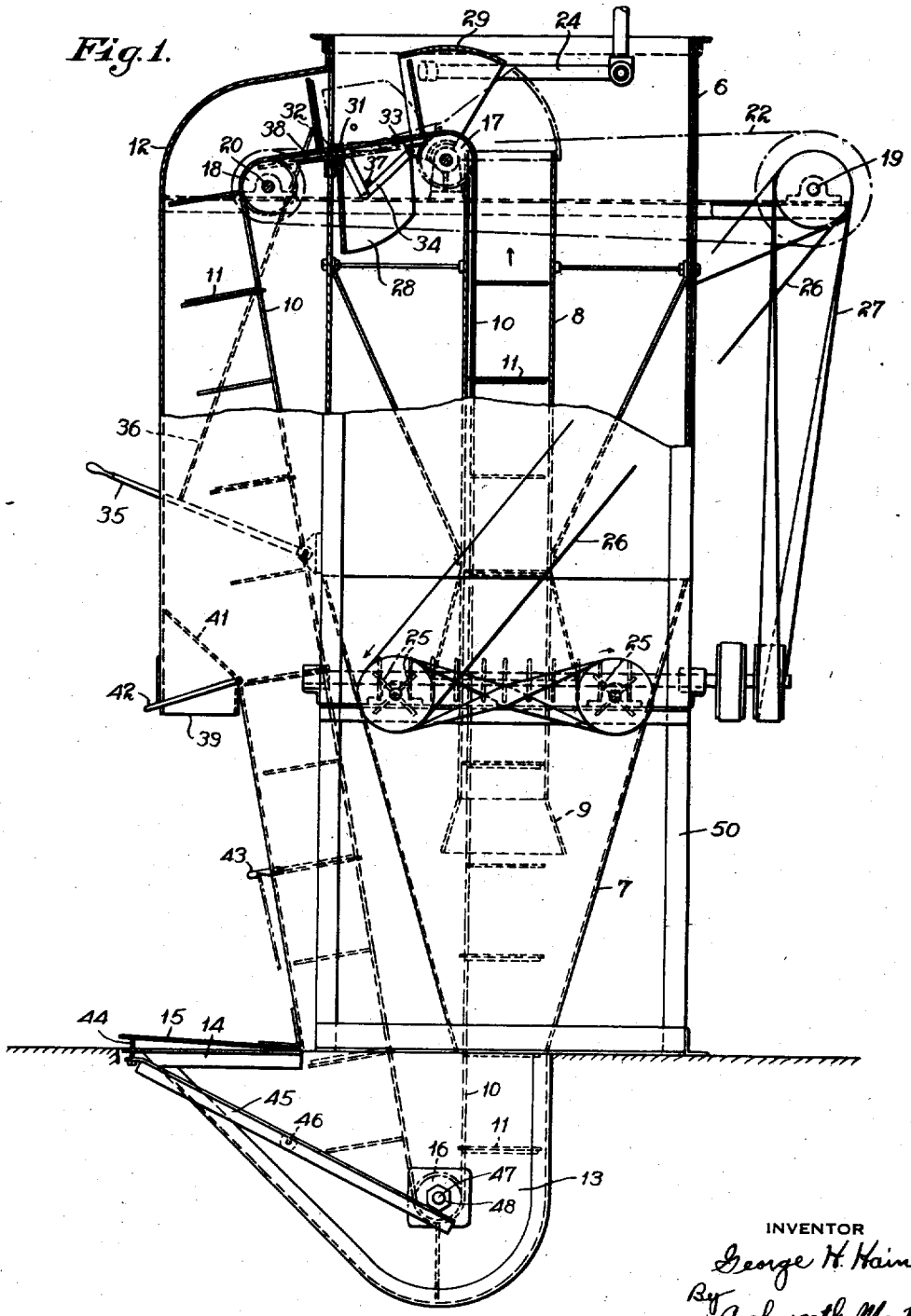
Figure 2:
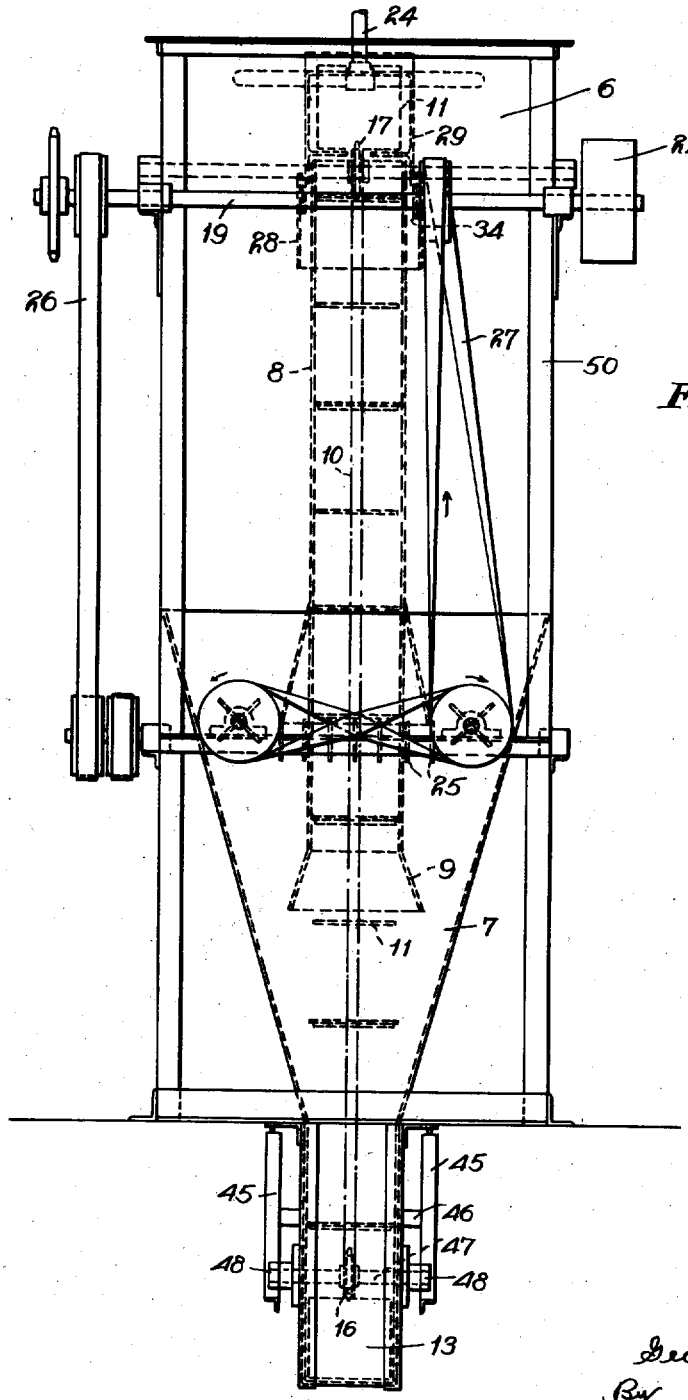
Figure 3:
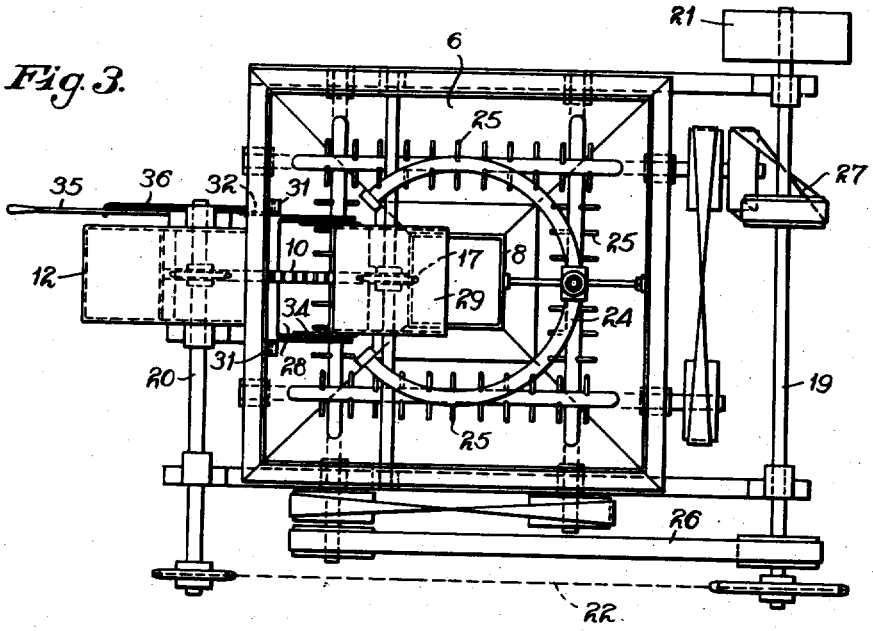
Figure 4:
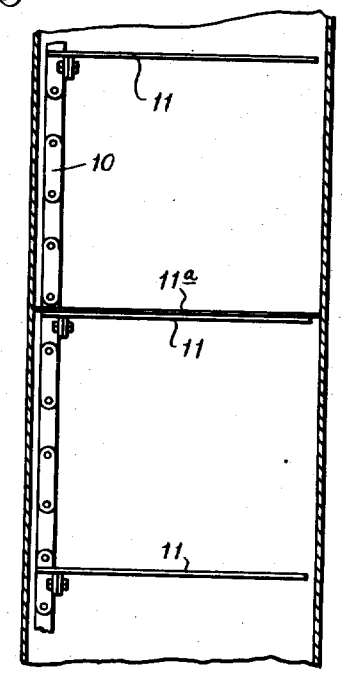
Figure 5:
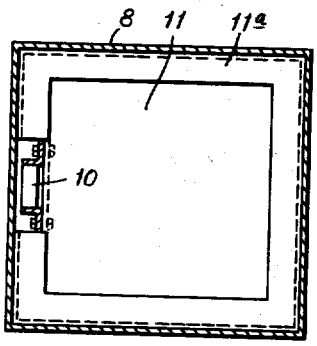

One form of apparatus by which my invention may be practised is shown in the accompanying drawing wherein Figure 1 is a view thereof partially in side elevation and partially in section; Fig. 2 is an edge elevational view thereof; Fig. 3 is a plan view; Fig. 4 is a view, on an enlarged scale, showing details of a portion of the conveyer, and Fig. 5 is a cross sectional view of the apparatus of Fig. 4.

The apparatus includes a mixing chamber 6 of hopper-like form in its lower portion 7, within which is mounted a vertically-disposed conduit 8 that is flared at its lower end 9. A conveyer chain 10 which carries vanes 11 moves through a continuous path that extends upwardly through the conduit 8 and returns to the lower end of the mixing chamber through a casing 12. The conveyer also passes through a charging chamber or material-receiving chamber or hopper 13 that is mounted below the floor level and has communication with the hopper 7. A charging opening 14 is provided in the floor and such opening may be covered by a platform or plate 15 when material is not being dumped into the hopper 13.

The conveyer chain passes around a sprocket wheel 16 that is located in the hopper 13 and around two sprockets 17 and 18 that are horizontally spaced to cause the return run of the conveyer to be guided through the casing 12. The chain is driven by the sprocket wheel 18 from a shaft 19 which carries a pulley 21 that may be driven from any suitable source of power, the shaft 19 having driving connection through sprocket wheels and a chain 22 with a shaft 20 which carries the sprocket wheel 18.

It will be seen that when materials are introduced into the charging chamber 13, they will be caught by the moving vanes of the conveyer and carried through the conduit 8. The materials are discharged at the upper end of the conduit 8 in the form of a spray and fall or sink into the hopper 7. The materials are charged into the chamber 13, until a sufficient quantity has accummulated in the mixing chamber 6 or until such chamber is nearly full.

Continued travel of the conveyer will circulate the material repeatedly through the conduit 8 to effect thorough intermixing thereof. If molasses or some other mixture has to be incorporated in the mixture, it may be introduced into the mixing chamber, through pipes 24.

As the material passes from the upper end of the conduit to the hopper 7, it will be broken up by toothed rollers 25 which are arranged in rectangular formation in the hopper 7 and are driven from the shaft 19 by belt drives 26 and 27. The toothed rollers serve to effectively mix the various ingredients and are particularly useful if molasses or some other liquid is being incorporated in the mixture because they will break up the pasty lumps which tend to form.

When the materials have been sufficiently mixed, they are carried by the conveyer from the mixing chamber 6 into the casing 12. To this end, I provide chutes or troughs 28 and 29 that are pivotally mounted in the upper end of the casing. The trough 28 is pivoted at 31 and carries a crank arm 32, while the trough 29 is loosely mounted on the shaft which carries the sprocket 17 and has a crank-like extension 33. The extension 33 is connected through toggle links 34 to the trough 28.

Ordinarily, the troughs occupy the positions shown in Fig. 1, so that there will be no interference with circulation of the materials in the mixing chamber.

After the materials have been thoroughly mixed, the crank arm 32 is rocked in a counter-clockwise direction by means of a hand lever 35 and a link 36, thus swinging the trough 28 upwardly and moving the trough 29 in a clockwise direction, to the positions shown in dotted lines in Fig. 1.

The movement of the trough 29 into position over the conduit 8 is caused by the bottom of the chute 28 engaging the toggle links 34 during upward movement of such chute. A pin 37 is mounted in the side wall of the chute 28 to break the toggle and to retract the chute 29 when the chute 28 is being swung to inoperative or retracted position.

When the chutes 29 and 28 occupy the positions shown in dotted lines in Fig. 1, they will direct the material from the upper end of the conduit 8 laterally to the casing 12. A deflecting plate 38 is provided in such casing, to direct the material toward the outer wall thereof and to a position where it will fall to the discharge spout 39 of the casing.

It will be seen that the downwardly-moving run of the conveyer chain 10 is inclined and that the vanes 11 thereof slope toward the outer wall of the casing 12. This arrangement results in any material which falls upon the upper sides of the descending vanes 11 being deflected still further laterally toward the discharge spout 39.

Another advantage arising from directing the conveyer through a generally horizontal path at the upper end of the mixing chamber resides in the fact that it enables the return run of the conveyer to lie outside of the mixing chamber. If both vertical runs of the conveyer were located entirely in the mixing chamber, it will be seen that there would be a tendency for a portion only of the materials to be circulated by the conveyer, leaving the other portions thereof undisturbed.

The discharge spout is controlled by a valve 41 which is operated by a handle 42. When the handle 42 is raised, the upper edge of the valve 41 is swung toward the conveyer chain, thus permitting material to fall through the spout 39 into sacks or other receptacles placed therebeneath.

The hinged plate 15 serves not only as a platform, but as a cover for the chamber 13. When the chamber 13 is being charged, the plate 15 is held in open position by a latch 43. After completion of a charge, the plate 15 is lowered, and after the material has been mixed, sacks are placed upon the plate 15, beneath the spout 39 to receive the mixed materials.

The free edge of the platform 15 is supported upon pins 44 that are carried by the outer ends of a pair of arms 45 which are pivoted at 46. Upon the ends of a shaft 47 which carries the sprocket 16, are secured polygonally-shaped discs or plates 48 against which the lower ends of the arms 45 bear, the weight of the platform 15 serving to hold such lower ends in engagement with the discs 48. As the shaft 47 rotates, the discs 48 will cause oscillation of the arms 45 about their pivots 46, thus vibrating the platform 15 and effecting settling and compacting of the materials in the bags being filled.

Certain of the vanes 11 carry wiping strips 11[a] as shown more clearly in Figs. 4 and 5, to serve as scrapers and prevent accumulation of material against the walls of the conduit 8. These strips may be of fiber board or any other suitable material.

The apparatus above described is shown as mounted within a framework 50 of angle bars and the like that are suitably secured together to form a unitary structure with the work-parts, so that the entire apparatus can be shipped in assembled condition and conveniently installed at the place of use.

I claim as my invention:—

1. Mixing apparatus comprising a mixing chamber, an upwardly-extending conduit within said chamber, and an endless conveyer movable upwardly through said conduit and having its downwardly-moving run disposed in a path outside of said chamber.

2. Mixing apparatus comprising a mixing chamber, an upwardly-extending conduit located centrally of the chamber, a hopper-like extension at the lower end of said chamber and extending to a point below the lower end of the conduit, and an endless conveyer movable upwardly through said conduit from the bottom of said extension, the downwardly-moving run of the conveyer being disposed exteriorly of the mixing chamber.

3. Mixing apparatus comprising a mixing chamber, an upwardly-extending conduit in said chamber, a conveyer for carrying material upwardly through said conduit, and deflector means at the upper end of said conduit movable into position to deflect material emerging therefrom in a direction transversely past the wall of the mixing chamber.

4. Mixing apparatus comprising a mixing chamber, an upwardly-extending conduit in said chamber, a casing disposed at the side of said chamber and communicating therewith, an endless conveyer movable upwardly through said conduit, and downwardly through said casing, and deflector means movable into position at the upper end of said conduit for directing material into said casing.

5. Mixing apparatus comprising a mixing chamber, an upwardly-extending conduit in said chamber, a casing disposed at the side of said chamber and communicating therewith, an endless conveyer movable upwardly through said conduit, and downwardly through said casing, and deflector means movable into position at the upper end of said conduit for directing material into said casing, the said casing having a discharge opening.

6. Mixing apparatus comprising a mixing chamber, a conduit vertically disposed within said chamber, means for advancing material upwardly through said conduit, and means for breaking up material discharged from the upper end of said conduit, during its movement to the lower end thereof.

7. Mixing apparatus comprising a mixing chamber, an upwardly-extending conduit within said chamber, means for advancing material upwardly through said conduit, and a rotatable toothed roller disposed exteriorly of said conduit to break up material moving from the upper end of said conduit to the lower end thereof.

8. Mixing apparatus comprising a mixing chamber, means for circulating material therein, a discharge casing having an outlet, a platform for supporting a receptacle beneath said outlet, and means actuated by movement of the circulating means for agitating said platform.

9. Mixing apparatus comprising a mixing chamber, means for circulating material in said chamber, a discharge spout, means for directing mixed material to said spout, a platform for supporting a receptacle beneath said spout, and means actuated by the material-circulating means for agitating said platform.

10. Mixing apparatus comprising a mixing chamber, an upwardly-extending conduit located within the chamber, a casing extending from a point adjacent to the upper end of the chamber to a point adjacent to the lower end thereof, and an endless conveyer movable upwardly through said conduit and downwardly through said casing.

11. Mixing apparatus comprising a mixing chamber of hopper-like form in its lower portion, a charging chamber disposed beneath the mixing chamber and communicating with said lower portion, a casing extending from a point adjacent to the top of the said chamber to a point adjacent to the lower end thereof, and an endless conveyer movable upwardly through the charging chamber to the mixing chamber and downwardly through said casing, into the charging chamber.

12. Mixing apparatus comprising a mixing chamber, a conduit having communication at its lower end with the lower portion of the chamber and at its upper end open for discharge directly into the chamber, a second conduit having a discharge opening, and an endless conveyer movable upwardly through the first-named conduit and downwardly through the second-named conduit.

13. Mixing apparatus comprising a mixing chamber, a conduit having communication at its lower end with the lower portion of the chamber and at its upper end open for discharge directly into the chamber, a second conduit having a discharge opening, an endless conveyer movable upwardly through the first-named conduit and downwardly through the second-named conduit, and means movable into position to prevent discharge of the material from the first-named conduit into the chamber and for directing the material into the second-named conduit.

14. Mixing apparatus comprising a mixing chamber, a conduit having communication at its lower end with the lower portion of the chamber and at its upper end open for discharge into the chamber, a discharge conduit, means for elevating material through the first-named conduit, and deflector means movable into position to prevent discharge of the material from the first-named conduit into the chamber, and to deflect said material into the second-named conduit.

15. Mixing apparatus comprising a chamber, an endless conveyer movable through two approximately vertical paths and through a connecting path that is located adjacent to the upper portion of the said chamber, means for directing material from the lower portion of the chamber into one of said first-named paths, for engagement by the conveyer, and means movable into position to cause material to be discharged from said connecting path into the chamber or to be carried along the said path.

16. Mixing apparatus comprising a chamber, a conveyer device for elevating material from the lower portion of the chamber into the upper portion thereof, and means operative to cause discharge of the material carried by the conveyer, either into the upper portion of the chamber or to a point exteriorly thereof.

In testimony whereof, I have hereunto signed my name.

GEORGE HERBERT HAINES.